United States Patent
Kojima (10) Patent No.: US 6,272,344 B1
(45) Date of Patent: Aug. 7, 2001

(54) POSITION REGISTRATION METHOD FOR MOBILE COMMUNICATIONS SYSTEM

(75) Inventor: Jun-ichiroh Kojima, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/325,376

(22) Filed: Jun. 4, 1999

(30) Foreign Application Priority Data

Jun. 9, 1998 (JP) ................................................. 10-160812

(51) Int. Cl.⁷ ........................................................ H04B 7/00
(52) U.S. Cl. ............................................. 455/435; 455/458
(58) Field of Search ..................................... 455/432, 433, 455/434, 435, 436, 445, 450, 452, 458, 456

(56) References Cited

U.S. PATENT DOCUMENTS

| | | | |
|---|---|---|---|
| 5,956,639 | * 9/1999 | Armbrustet et al. | 455/435 |
| 6,081,715 | * 6/2000 | La Porta et al. | 455/435 |

FOREIGN PATENT DOCUMENTS

| | | |
|---|---|---|
| 3-36344 | 5/1991 | (JP) . |
| 3-279929 | 12/1991 | (JP) . |
| 4-220821 | 8/1992 | (JP) . |
| 5-55991 | 3/1993 | (JP) . |
| 5-83190 | 4/1993 | (JP) . |
| 6-205457 | 7/1994 | (JP) . |
| 6-244780 | 9/1994 | (JP) . |
| 6-319168 | 11/1994 | (JP) . |
| 7-30962 | 1/1995 | (JP) . |
| 11-46380 | 2/1999 | (JP) . |

\* cited by examiner

*Primary Examiner*—Thanh Cong Le
(74) *Attorney, Agent, or Firm*—Sughrue, Mion, Zinn, Macpeak & Seas, PLLC (57) ABSTRACT

A position registration method for a mobile communications system which can achieve reduction of the number of times of position registration of a mobile station significantly without any restriction when the mobile station is present in a mobile space such as an electric train or a bus and moves together with the mobile space. An existing position of a mobile space such as an electric train or a bus in a real space is position registered into a switching control station through a base station using a control channel similarly to mobile stations. In the mobile space, a position recognition channel which is a radio channel for confirmation of whether or not a mobile station is in the mobile space is transmitted from a position recognition transmission apparatus, and when the mobile station receives the position recognition channel, it determines that it is in the mobile space. When the mobile station is in the mobile space, the registration position of the mobile station is updated depending upon updating of the position registration of the mobile space.

6 Claims, 6 Drawing Sheets

POSITION REGISTRATION METHOD FOR MOBILE COMMUNICATIONS SYSTEM

BACKGROUND OF THE INVENTION

1. Field of the Invention

The present invention relates to a position registration method for a cellular mobile communications system which includes a plurality of base stations, a switching control station and a mobile station.

2. Description of the Related Art

In a cellular mobile communications system, a mobile station receives a forward link radio wave of a base station not only during calling but also during call waiting, discriminates an area in which the mobile station exists from the received signal and performs, if it enters a different service area, a position registration operation.

Increase of the number of mobile stations and reduction in size of areas increase the number of position registrations of call waiting mobile stations and suppress original pursuit call switching processing. Particularly where a large number of passengers having call waiting mobile stations board and move with a means of transportation such as an electric train or a bus, each time the means of transportation passes an area boundary and enters another service area, position registration operations are started at a time by the mobile stations, and in order to process a large number of position registration requests which are generated at a time in this manner, the load applied to the switch increases suddenly and original pursuit switching processing for calls in service is suppressed. Furthermore, the condition described above is liable to occur in rush-hours in the morning and in the evening, and in order to process such a large number of position registration requests as described above, a sufficient margin is required for the capacity of the equipment and this is economically disadvantageous.

A position registration system which reduces such a load to a switch caused by a large number of position registration requests as described above is disclosed in Japanese Patent Laid-Open No. 319168/1994 wherein a speed of movement of a mobile station is calculated to estimate a range of movement of the mobile station, and, when the mobile station goes out of the range, position registration is performed thereby to reduce the number of times of position registration. The position registration system, however, has the following problems.

The first problem resides in that the effect of reduction of the number of times of position registration is low. The reason is that the range of movement is an estimated value and the reduction effect is lost when the mobile station goes out of the estimated range.

The second problem resides in that the range within which the load reduction effect by the reduction of the number of times of position registration is enjoyed is narrow. The reason is that, where the mobile station moves over a long distance, it is difficult to accurately estimate the entire path of movement of the mobile station, and the reduction of the number of times of position registration based on an estimated route is effective only for limited areas.

SUMMARY OF THE INVENTION

It is an object of the present invention to provide a position registration method for a mobile communications system which can achieve reduction of the number of times of position registration of a mobile station significantly without any restriction when the mobile station is present in a mobile space such as an electric train or a bus and moves together with the mobile space.

In order to attain the object described above, there is provided a position registration method for a cellular mobile communications system which includes a plurality of base stations which individually take charge of a plurality of service areas in a real space, a mobile station, and a switching control station for acquiring position information of the mobile station through the base stations, comprising the steps of registering an existing position of a mobile space such as an electric train or a bus in the real space into the switching control station through the base stations using a control channel, transmitting, in the mobile space, a position recognition channel which is a radio channel for confirming whether or not the mobile station is present in the mobile space, discriminating whether or not the position recognition channel is received by the mobile station in the mobile space thereby to discriminate whether or not the mobile station is in the mobile space, and updating, when the mobile station is in the mobile space, the registration position of the mobile station depending upon updating of the position registration of the mobile space.

The position registration method for a cellular mobile communication system may be constructed such that an identification number unique to the mobile space is transmitted over the position recognition channel in the mobile space, and the mobile station which receives the identification number transmits the identification number to the base stations over a control channel to perform a position registration operation into the switching control station, and then the switching control station collates the identification number to discriminate that the mobile station has entered the mobile space which has the pertaining identification number.

In this instance, the position registration method for a cellular mobile communications system may be constructed such that, if, when the mobile station is placed into a reception disabled state from a reception enabled state of the position recognition channel, a position registration operation is performed through the base stations over a control channel in a condition wherein no identification number of the mobile space is available, then the switching control station determines that the mobile station has gone out of the mobile space. Alternatively, the position registration method for a cellular communication system may be constructed such that, if the identification number of the mobile space being transmitted over the position recognition channel cannot be received any more, the mobile station performs a position registration operation over the control channel between the mobile station and the pertaining base station even if the mobile station is present in the mobile space.

The position registration method for a cellular mobile communications system may be constructed such the existing position of the mobile space in the real space is registered into the switching control station using a control channel between the base stations and a base station opposing transmission-reception apparatus which is provided in the mobile space for transmitting an identification number unique to the mobile space.

In this instance, the position registration method for a cellular mobile communications system may be constructed such that the mobile space includes a position recognition channel transmission apparatus for reporting the identification number of the mobile space and a number of a control channel from one of the base stations which has been received by the base station opposing transmission-reception apparatus, and the mobile station in the mobile space changes, if, during reception of the position recognition channel, the number of the control channel reported by the position recognition channel changes, the control channel to be used between the mobile station and the base station to the control channel of the changed number, but does not perform a position registration operation.

With the position registration method for a cellular mobile communications system, since position registration operations of n mobile stations which are carried in a mobile space such as an electric car or a bus and move in a body together with the mobile space can be represented by a position registration operation of the base station opposing transmission-reception apparatus of the mobile space, the number of times of position registration can be reduced to 1/n, and economization of the base station equipments can be achieved. Further, since the number of times by which a position registration operation must be performed by each mobile station decreases, there is an advantage that consumption of the battery power supply can be suppressed and the uninterrupted service time can be increased.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENTS

Figure 1:
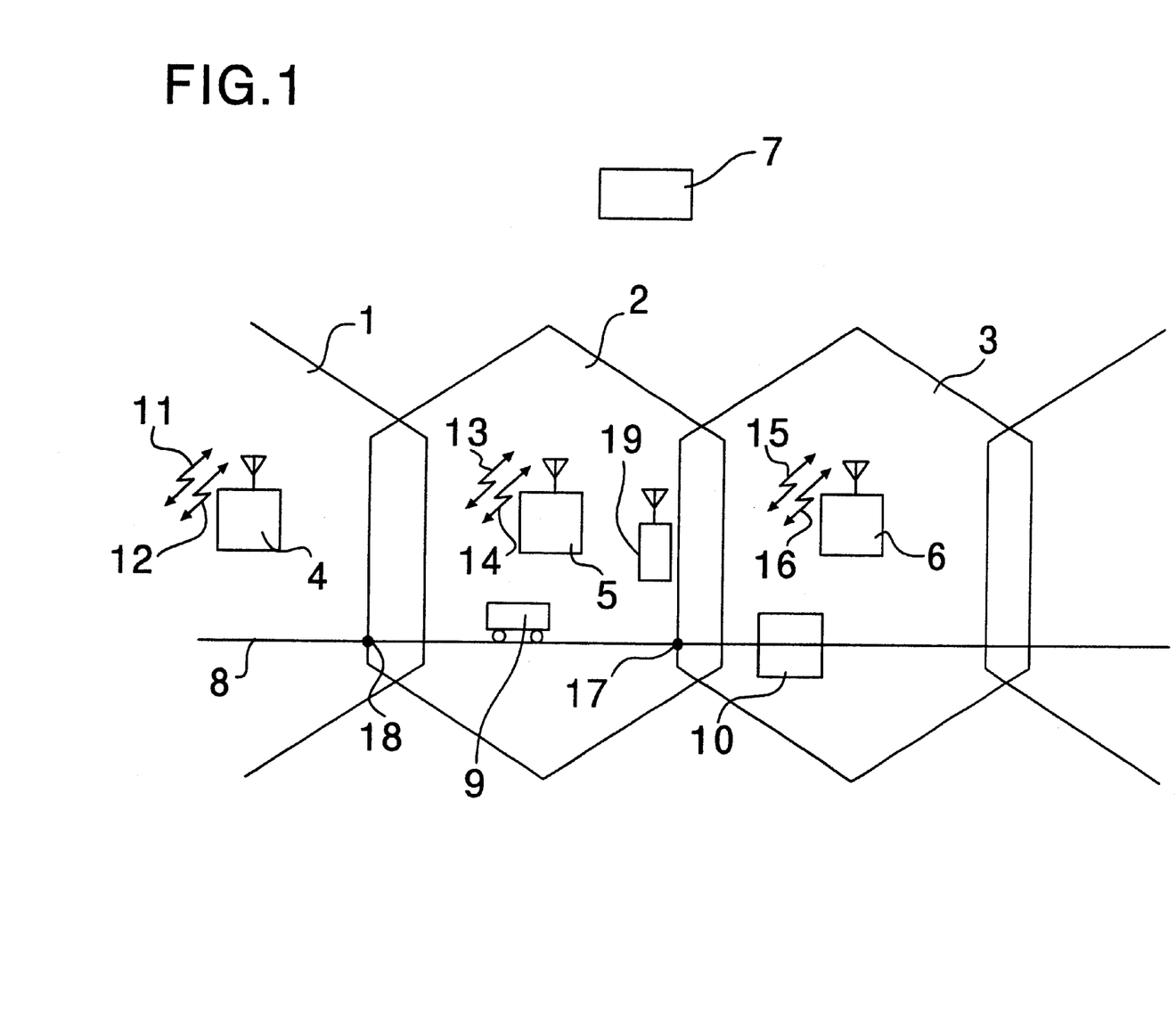
FIG. 1 is a system diagram of a cellular mobile communications system including a switching control station, a mobile station and a mobile space such as an electric train or a bus.

Referring first to FIG. 1, there is shown a cellular mobile communications system to which the present invention is applied. The cellular mobile communications system includes a plurality of base stations 4 to 6 which take charge of service areas 1 to 3 disposed in a honeycomb like configuration in a real space, respectively, a switching control station 7 for controlling the base stations 4 to 6, and a mobile station 19 which is carried in and moves together with a mobile space 9 such as an electric train or a bus across the service areas 1 to 3 along a route 8. In FIG. 1, the mobile space 9 is shown present in the service area 2. Reference numerals 11, 13 and 15 denote controls channels and 12, 14 and 16 denote message channels for the base stations 4 to 6, respectively.

Figure 2:
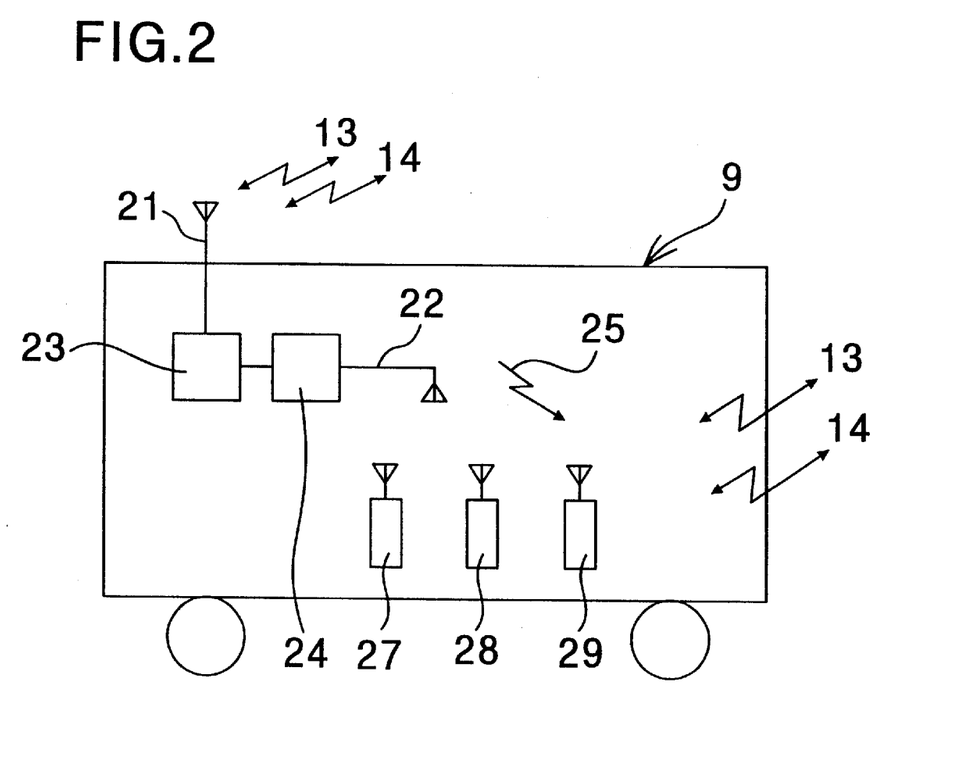
FIG. 2 is a diagrammatic view showing a system carried in the mobile space shown in FIG. 1.
Figure 4:
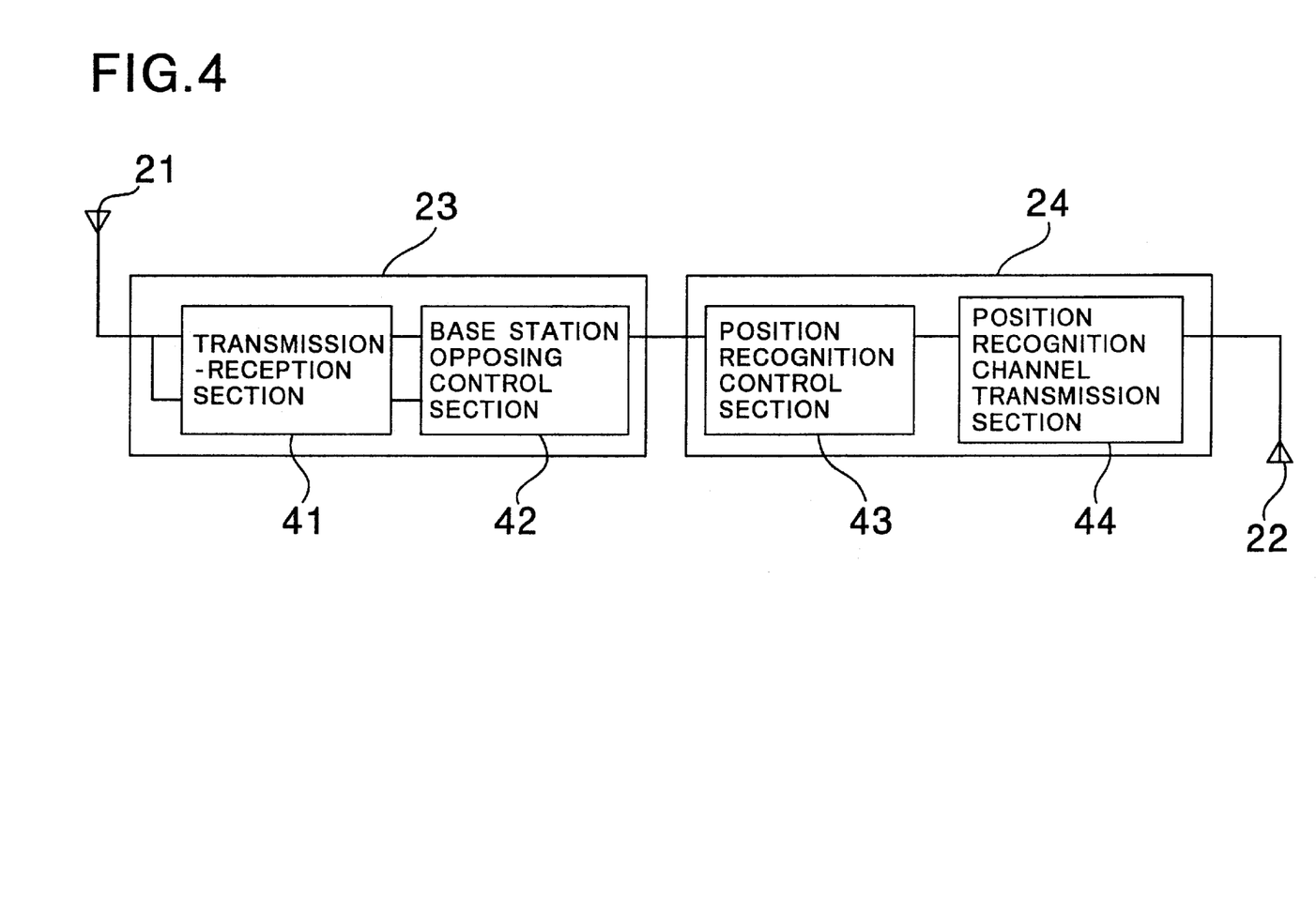
FIG. 4 is a block diagram of a base station opposing transmission-reception apparatus and a position recognition channel transmission apparatus carried in the mobile space shown in FIG. 1.

Referring now to FIG. 2, the mobile space 9 has a base station opposing transmission-reception apparatus 23 and a position recognition channel transmission apparatus 24 carried therein. Referring to FIG. 4, the base station opposing transmission-reception apparatus 23 includes a transmission-reception section 41 and a base station opposing control section 42 and can communicate with a base station over a control channel and a message channel through an antenna 21 similarly to the mobile station 19. The position recognition channel transmission apparatus 24 includes a transmission section 44 and a position recognition control section 43 and transmits a position recognition channel 25 (FIG. 2) from another antenna 22 into the mobile space 9. In FIG. 2, it is shown that mobile stations 27 to 29 are carried in the mobile space 9.

Figure 5:
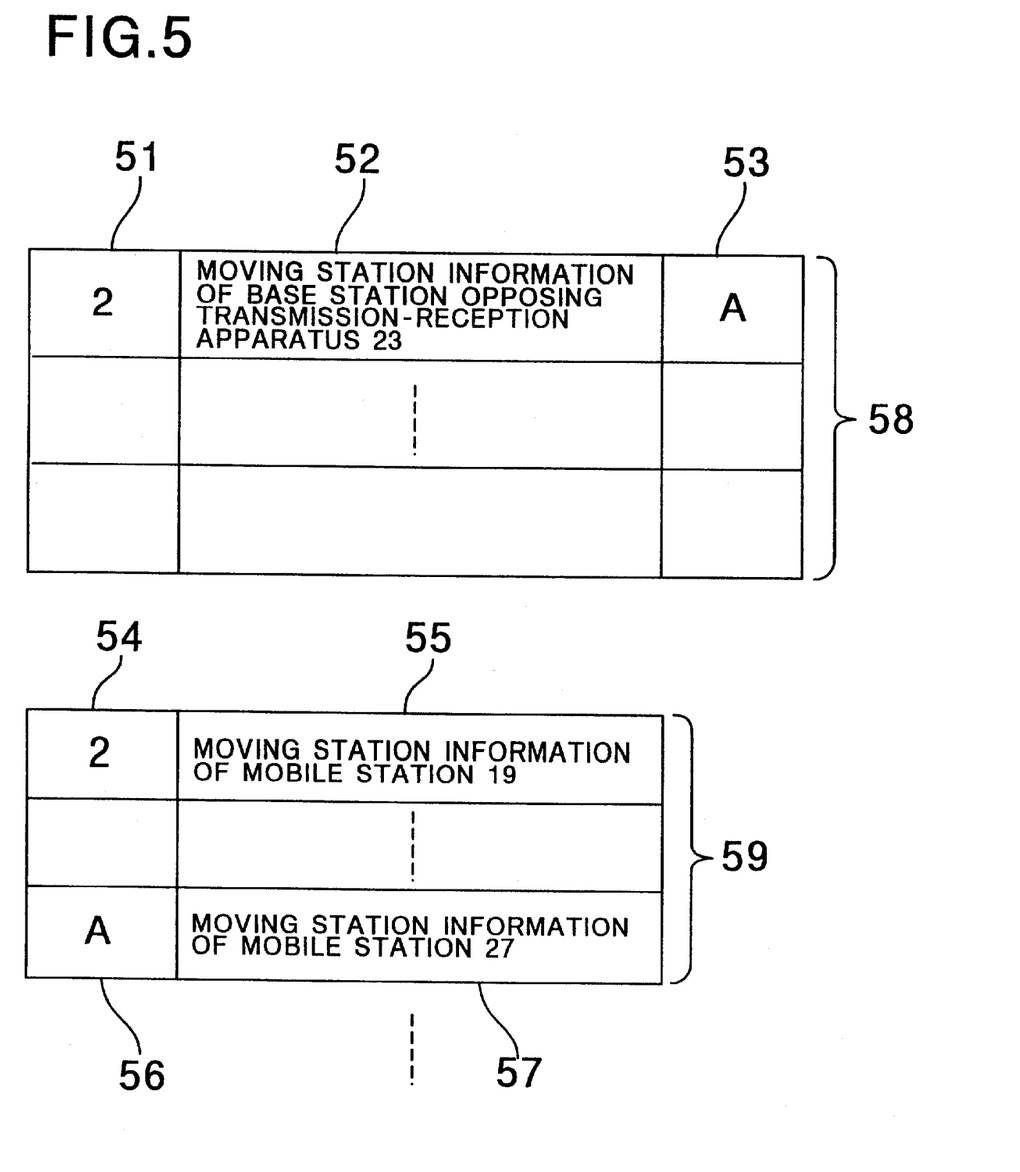
FIG. 5 is a diagrammatic view showing a construction of a memory in the switching control station shown in FIG. 1.

FIG. 5 shows a position registration memory for mobile stations and mobile spaces provided in the switching control station 7. An ordinary mobile station is stored in a memory area 59, and the stored contents of the memory area 59 include data 54 representative of the number of a service area in which the mobile station is present and data 55 representative of information of the mobile station (data with which the system discriminates that the mobile station is a legal subscriber such as a telephone number or a product number). Information representative of the position at which a mobile space exists is stored in another memory area 58 of the position registration memory, and the stored contents of the memory area 58 include data 51 representative of a service area number, data 52 representative of mobile station information relating to the mobile space (base station opposing transmission-reception apparatus 23), and data 53 representative of an imaginary service area number.

Figure 6:
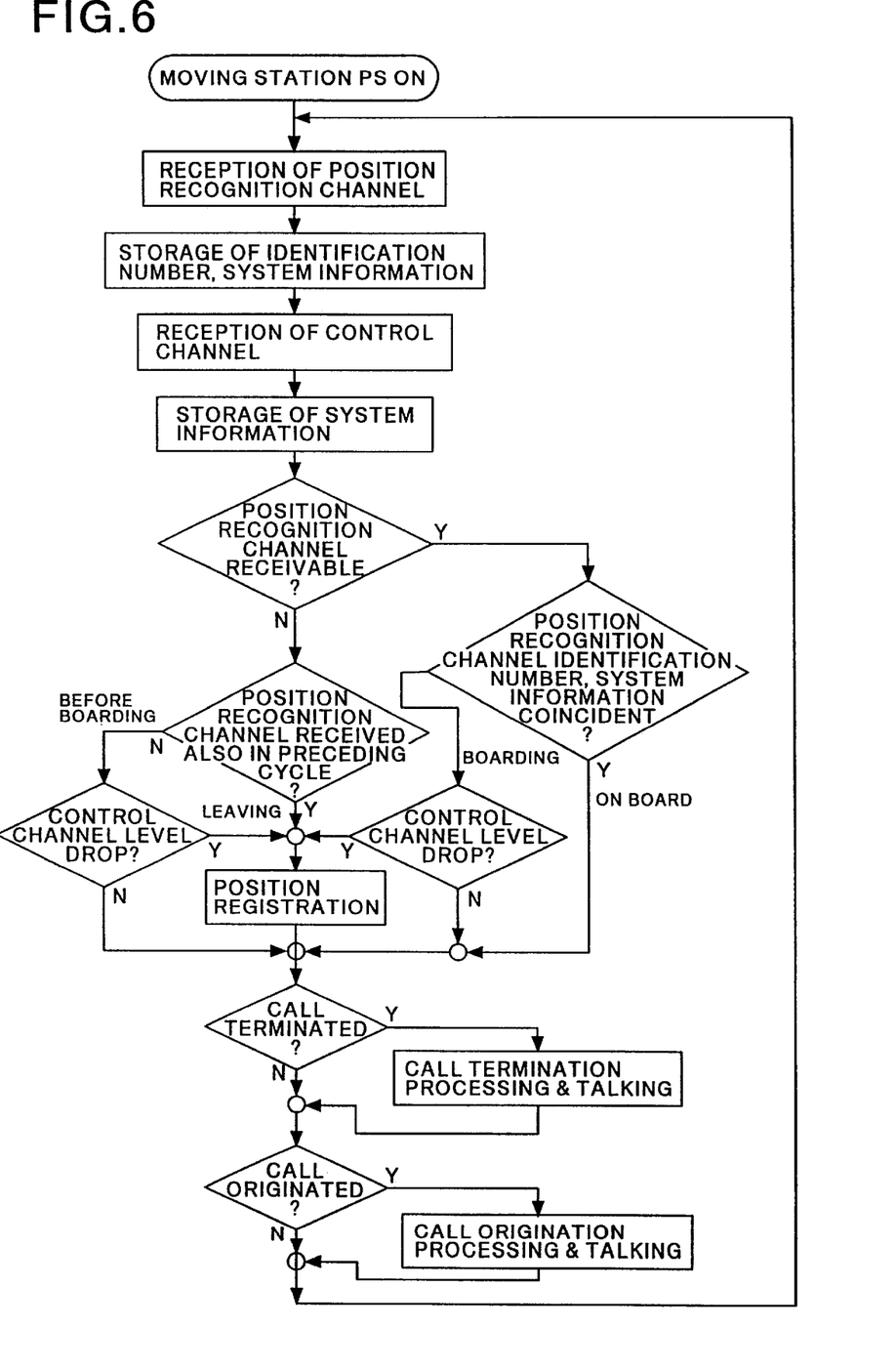
FIG. 6 is a flow chart illustrating operation of the mobile station shown in FIG. 1.

In the following, operation of the mobile communications system is described with reference to FIG. 6.

A mobile station which enters the mobile space 9 thereafter receives the position recognition channel 25 at predetermined intervals of time, acquires an identification number unique to the mobile space in which the mobile station exits, and sends out the identification number over the control channel 13 upon position registration operation which is performed for a base station in the real space.

The switching control station 7 has a function of updating, when the mobile space moves in the real space and performs a position registration operation, also the position information of the mobile station from the identification number of the mobile space, in which the mobile station is present, acquired through the base station.

The base station opposing transmission-reception apparatus 23 carried in the mobile space 9 acquires system information (an area number, call waiting channels, call origination channels and so forth) of the service area in which the base station opposing transmission-reception apparatus 23 is present through the control channel. Further, when the mobile space 9 moves in the real space and enters another service area, the base station opposing transmission-reception apparatus 23 performs a position registration operation. The position recognition channel transmission apparatus 24 transmits the identification number unique to the mobile space 9 and the system information described above over the position recognizing channel.

The switching control station 7 grasps, in the position registration operation, the area in which the mobile space 9 exits and stores the grasped area into the mobile station position registration memory 59.

Since the call waiting mobile station having entered the mobile space 9 receives the position recognition channel 25 at predetermined time intervals and the identification number of the mobile space 9 which has not been received till now exhibits a predetermined reception level, it starts a position registration operation and transmits the received mobile space identification number to the base station.

The switching control station 7 collates the service area in which the mobile station is present with the service area in which the mobile space 9 is present, and if the service areas coincide with each other, then the switching control station 7 determines that the mobile station has entered the mobile space 9 and transmits a position registration operation stopping signal to the mobile station through the base station. The existing position of the mobile station is thereafter updated depending upon the position data of the mobile space 9.

Also after the position registration operation stopping signal mentioned above is received, the mobile station continues reception of the position recognition channel 25 at predetermined intervals of time, and performs call origination or call termination with a call waiting channel or a reception channel of the real space indicated by the position recognition channel 25. Even if it becomes impossible to receive the call waiting channel as a result of movement of the mobile space 9 in the real space, no position registration operation is performed, but the system information of the service area after the movement is read out from the position recognition channel 25 and a new call waiting channel is used newly.

If the mobile station goes out of the mobile space 9 into the real space, then since the identification number of the mobile space 9 which has been received till now by reception of the position recognition channel 25 cannot be received any more, the mobile station performs a position registration operation to the base station. At this time, the mobile station can receive no mobile space identification number and does not have a mobile space identification number to be transmitted to the base station by the position registration operation. The switching control station 7 determines that there is no mobile space in which the mobile station exists and issues an instruction to start position registration, and then updates the position data independently for the mobile station.

After the position registration start signal is received, if the mobile station cannot receive a mobile space identification number over the position recognition channel 25, then it starts a position registration operation in response to deterioration of the reception level of the call waiting channel, and performs position registration each time the mobile station enters a new service area as a result of movement thereof in the real space.

A detailed example of the operation described above is described below.

It is assumed that, when the mobile space 9 of FIG. 1 moves along the route 8 and stops at a station 10 in the service area 3, a user of the mobile station 27 boards the mobile space 9 at the station 10 and moves toward the service area 1 together with the mobile space 9. Before the mobile station 27 boards the station 10, it catches the control channel 15 of the base station 6, but does not receive the position recognition channel 25. It is stored in the switching control station 7 that the mobile station 27 exists in the service area 3 and is not in the mobile space 9. After the mobile station 27 boards the mobile space 9 at the station 10, it begins to receive a radio wave from the position recognition channel transmission apparatus 24, and from the fact that the reception condition of the reception channel of the position recognition channel 25 changes, the mobile station 27 determines that it has moved into or out of the mobile space 9 and starts a position registration operation if there is no deterioration of the reception level of the control channel 15. At this time, the mobile station 27 transmits also the received mobile space identification number to the base station 6.

The switching control station 7 collates the service area in which the mobile station 27 exists with the service area in which the mobile space 9 exists. If the service areas coincide with each other, then the switching control station 7 determines that the mobile station 27 has entered the mobile space 9, and transmits a position registration operation stopping signal to the mobile station 27 through the base station 6. The existing position of the mobile station 27 is thereafter updated depending upon the position data of the mobile space 9.

In the mobile space 9, the position recognition channel transmission apparatus 24 of FIG. 2 issues area information toward the inside of the mobile space 9 over the position recognition channel 25, and the mobile station 27 continues, after reception of the position registration operation stopping signal, reception of the position recognition channel 25 at predetermined intervals of time and performs call origination or call termination with a call waiting channel and a call origination channel of the real space indicated by the channel. When the mobile space 9 moves into the service area 2 in the real space, although it becomes impossible to receive the control channel 15, the mobile station 27 does not perform a position registration operation but reads out the system information of the destination of the movement from the position recognition channel 25 and starts use of a new control channel 13.

Figure 3:
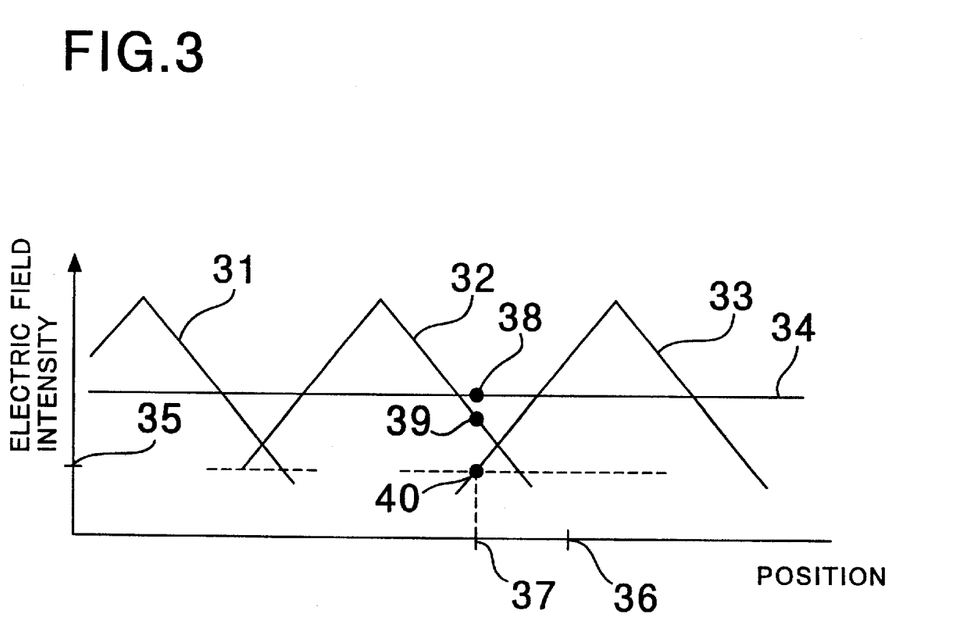
FIG. 3 is a diagram illustrating a variation of an electric field intensity when the mobile space shown in FIG. 1 moves along a path.

Pursuit switching upon movement of the mobile space 9 is described in connection with a reception electric field intensity variation illustrated in FIG. 3. Referring to FIG. 3, reference numerals 31 to 33 denote electric field intensities of the service areas 1 to 3, respectively. When the mobile space 9 moves to a point 37, the control channel 15 to the mobile station 27 which has been brought into the mobile space 9 at a point 36 of FIG. 1 drops to a level 35 which serves as a reference for a position registration operation. The base station opposing transmission-reception apparatus 23 carried in the mobile space 9 searches out the control channel 13 which can be received most intensely similarly as in an ordinary mobile station and performs position registration.

From the system information of the service area 2 acquired by the operation just descried, the number of the communication channel which has been reported over the position recognition channel 25 is changed from the control channel 15 to the control channel 13. Also the mobile station 27 begins an operation to search for a control channel to be used newly. In particular, the control channel to be used is changed to the control channel 13 of the service area 2 reported over the position recognition channel 25, and the reception level is the level 39 which allows reception. Consequently, the control channel to be used is changed over to the control channel 13 without performing a position registration operation. Even when the mobile station 27 comes to a point 18 which is the boundary between the service areas, the mobile station 27 does not start a position registration operation. Also the other mobile stations 28 and 29 do not start their position registration operation. It is to be noted that reference numerals 34 and 38 denote each an electric field level of the position recognition channel 25 in the mobile space 9.

If the user of the mobile station 27 leaves the mobile space 9 at the station 10, then as the mobile station 27 moves away from the mobile space 9, the reception electric field intensity of the position recognition channel 25 drops. When the reception electric field intensity drops to the level 35, the mobile station 27 catches the control channel 15 which can be received with the maximum level then and performs position registration into the service area 3.

In the operation described above, when the mobile station 27 remains in the mobile space 9, although it performs position registration into the base station only once, it does not perform position registration until after it goes out of the mobile space 9. Further, also upon boarding or leaving, a position registration operation is performed successively and there is no trouble with a service. The operation described above is illustrated in summary in FIG. 6.

Subsequently, operation of the mobile space 9 is described. Referring to FIG. 1, the switching control station 7 performs position information management similar to that for an ordinary mobile station for the base station opposing transmission-reception apparatus 23 of the mobile space 9. The position recognition control section 43 of FIG. 4 works system information acquired by the base station opposing transmission-reception apparatus 23 upon position registration operation, reports the system information of the service area of the real space to the mobile stations 27 to 29 in the mobile space 9 using the position recognition channel transmission section 44 and instructs the mobile stations 27 to 29 of a destination control channel of the changeover.

The base station opposing transmission-reception apparatus 23 also has telephone numbers and performs functions similar to those of the mobile station 27. Therefore, in the following description, the base station opposing transmission-reception apparatus 23 is referred to as mobile station 23. At the point 17 and the point 18 after the mobile space 9 leaves the station 10 of FIG. 1, the mobile station 23 catches the control channel 13 and the control channel 11 and are position registered into the service area 2 and the service area 1, respectively.

Now, the data of the mobile stations and the mobile space stored in the position registration memory of the switching control station 7 are described.

Referring to FIG. 1, position information of an ordinary mobile station 19 outside the mobile space 9 is stored in the memory area 59 of FIG. 5, and the number of the service area in which the mobile station 19 exists is placed in the data 54 and mobile station information of the mobile station 19 is placed in the data 55. In the example shown in FIG. 5, in regard to the mobile station 19, the service area 2 is placed in the data 54 and mobile station information of the mobile station 19 is placed in the data 55. In regard to the mobile station 19, each time it moves and performs position registration, the service area number of the data 54 is re-written.

Meanwhile, position information of the mobile space 9 is stored into the memory area 58 for mobile spaces, and the stored contents of the memory area 58 includes the data 51 regarding the number of the service area in which the mobile space 9 exists, the data 52 regarding mobile station information (data with which the system discriminates that the mobile station is a legal subscriber such as a telephone number or a product number) registered in the base station opposing transmission-reception apparatus 23 by the mobile space 9, and the data 53 relating to an imaginary service area number A for mobile stations in the mobile space 9.

Further, position information of, for example, the mobile station 27 in the mobile space 9 is stored in the memory area 59 for mobile stations, and the stored contents of the memory area 59 include data 56 relating to the number of the service area in which the mobile station 27 exists, and data 57 relating to mobile station information (data with which the system discriminates that the mobile station is a legal subscriber such as a telephone number or a product number). However, the data 56 indicates not the service area number of the base station, but the imaginary service area number A registered by the base station opposing transmission-reception apparatus 23 of the mobile space 9.

If a call is terminated at the mobile station 27 in the mobile space 9, then the switching control station 7 checks the position registration memory, searches out the data 57 of the mobile station 27 from within the memory area 59 and reads out from the data 56 that the area in which the mobile station 27 exists is the imaginary service area number A which relies upon the mobile space 9. Then, the switching control station 7 reads out from the data 53 of the memory area 58 that the imaginary service area number A actually is the service area 2 in which the mobile space 9 exists. By the operation described above, the switching control station 7 recognizes that the mobile station 27 is moving in the service area 2 together with the mobile space 9, and performs call termination processing for the mobile station 27 over the control channel 13 from the base station 5 of the service area 2.

If the mobile space 9 goes out of the service area 2 of FIG. 1 and enters the service area 3, then since the service area number of the data 51 of the memory area 58 changes from 2 to 3, this follows that also the service area number of the mobile station 27 in the mobile space 9 changes from 2 to 3. This similarly applies to the other mobile stations 28 and 29 in the mobile space 9, and position registration information of the mobile station 27, 28 and 29 in the mobile space 9 is updated collectively depending upon updating of the position registration of the mobile space 9.

While a preferred embodiment of the present invention has been described using specific terms, such description is for illustrative purposes only, and it is to be understood that changes and variations may be made without departing from the spirit or scope of the following claims.

What is claimed is:

1. A position registration method for a cellular mobile communications system which includes a plurality of base stations which individually take charge of a plurality of service areas in a real space, a mobile station, and a switching control station for acquiring position information of said mobile station through said base stations, comprising the steps of:

registering an existing position of a mobile space such as an electric train or a bus in the real space into said switching control station through said base stations using a control channel;

transmitting, in said mobile space, a position recognition channel which is a radio channel for confirming whether or not said mobile station is present in said mobile space;

discriminating whether or not the position recognition channel is received by said mobile station in said mobile space thereby to discriminate whether or not said mobile station is in said mobile space; and updating, when said mobile station is in said mobile space, the registration position of said mobile station depending upon updating of the position registration of said mobile space.

2. A position registration method for a cellular mobile communication system as claimed in claim 1, wherein an identification number unique to said mobile space is transmitted over the position recognition channel in said mobile space, and said mobile station which receives the identification number transmits the identification number to said base stations over a control channel to perform a position registration operation into said switching control station, and then said switching control station collates the identification number to discriminate that said mobile station has entered said mobile space which has the pertaining identification number.

3. A position registration method for a cellular mobile communications system as claimed in claim 2, wherein, if, when said mobile station is placed into a reception disabled state from a reception enabled state of the position recognition channel, a position registration operation is performed through said base stations over a control channel in a condition wherein no identification number of said mobile space is available, then said switching control station determines that said mobile station has gone out of said mobile space.

4. A position registration method for a cellular communication system as claimed in claim 2, wherein, if the identification number of said mobile space being transmitted over the position recognition channel cannot be received any more, said mobile station performs a position registration operation over the control channel between said mobile station and the pertaining base station even if said mobile station is present in said mobile space.

5. A position registration method for a cellular mobile communications system as claimed in claim 1, wherein the existing position of said mobile space in the real space is registered into said switching control station using a control channel between said base stations and a base station opposing transmission-reception apparatus which is provided in said mobile space for transmitting an identification number unique to said mobile space.

6. A position registration method for a cellular mobile communications system as claimed in claim 5, wherein said mobile space includes a position recognition channel transmission apparatus for reporting the identification number of said mobile space and a number of a control channel from one of said base stations which has been received by said base station opposing transmission-reception apparatus, and said mobile station in said mobile space changes, if, during reception of the position recognition channel, the number of the control channel reported by the position recognition channel changes, the control channel to be used between said mobile station and the base station to the control channel of the changed number, but does not perform a position registration operation.

* * * * *